(12) United States Patent
Li

(10) Patent No.: US 12,718,594 B2
(45) Date of Patent: Aug. 25, 2026

(54) VISUAL PRESENTATION OF VEHICLE POSITIONING RELATIVE TO SURROUNDING OBJECTS

(71) Applicant: Saishi Frank Li, Austin, TX (US)

(72) Inventor: Saishi Frank Li, Austin, TX (US)

( * ) Notice: Subject to any disclaimer, the term of this patent is extended or adjusted under 35 U.S.C. 154(b) by 353 days.

(21) Appl. No.: 18/356,506

(22) Filed: Jul. 21, 2023

(65) Prior Publication Data

US 2024/0029451 A1 Jan. 25, 2024

Related U.S. Application Data

(60) Provisional application No. 63/391,148, filed on Jul. 21, 2022.

(51) Int. Cl.

*G06V 20/56* (2022.01)
*B60K 35/22* (2024.01)
*G06T 7/70* (2017.01)
*G06V 10/774* (2022.01)
*B60K 35/28* (2024.01)

(52) U.S. Cl.

CPC ............ *G06V 20/588* (2022.01); *B60K 35/22* (2024.01); *G06T 7/70* (2017.01); *G06V 10/774* (2022.01); *B60K 35/28* (2024.01); *B60K 2360/176* (2024.01); *G06T 2207/20081* (2013.01); *G06T 2207/20084* (2013.01); *G06T 2207/30256* (2013.01)

(58) Field of Classification Search

None

See application file for complete search history.

(56) References Cited

U.S. PATENT DOCUMENTS

2014/0074318 A1* 3/2014 Lim ......................... G07C 9/20 701/2
2019/0001987 A1* 1/2019 Kim ...................... B60W 40/02
2020/0320742 A1* 10/2020 Margol ................... B60R 11/04
2021/0176311 A1* 6/2021 Yang ..................... G06F 16/487
2021/0304514 A1* 9/2021 Croxford ............... G06V 20/20
2024/0046074 A1* 2/2024 Lewis ..................... G10L 15/18

* cited by examiner

*Primary Examiner* — Leon Viet Q Nguyen
(74) *Attorney, Agent, or Firm* — Patterson + Sheridan, LLP

(57) ABSTRACT

Methods for visual presentation of vehicle positioning relative to the surrounding objects using an electronic computer device are presented, the methods including: causing the electronic computing device to provide a display of the interested objects on a same interface according to their relative positions; enabling instant communications among the objects displayed on the same interface; enabling an instant screen sharing among the objects displayed on the same interface and among broader audiences. In some embodiments, the methods causing the electronic computing device to provide a display of the interested objects on a same interface according to their relative positions include: pre-processing and calibrating the image capturing devices; receiving a plurality of images; building a deep learning model; constructing a driving surface; applying a deep learning model to identify interested objects; determining positions of objects on a driving surface; and presenting the objects on the driving surface screen.

20 Claims, 11 Drawing Sheets

VISUAL PRESENTATION OF VEHICLE POSITIONING RELATIVE TO SURROUNDING OBJECTS

CROSS-REFERENCE TO RELATED APPLICATIONS

This application claims benefit of and priority to U.S. Patent Application Ser. No. 63/391,148, entitled "Visual Presentation of Vehicle Positioning Relative to Surrounding Objects," filed Jul. 21, 2022, and assigned to the assignee hereof, the entire contents of which are hereby incorporated by reference.

BACKGROUND

On-road safety relies on many factors, including the skills and attentiveness of the driver of a vehicle and the behavior of other vehicle operators. When the distance between two or more vehicles collapses to zero, a collision occurs. Typically, vehicles are equipped with mirrors that allow drivers to observe portions of the driving environment that would be typically outside of the field of vision of the driver when the driver is looking forwards (e.g., behind and to the sides of the driver). While mirrors provide instant and direct information about the driving environment, it is "one directional", which means the driver can only gain the instant knowledge on one side of the vehicle at a time. Many times, when a driver focuses on one side, an incident and result collision can occur on a different side of the vehicle. Further, because viewing the driving environment through a mirror may involve physical body movement, some amount of time may elapse, and accidents may occur within this time.

In recent years, additional techniques have been developed to augment the driver's situational awareness and assist drivers in maintaining the vehicle's position and distance relative to other objects. One popular method is to use radar beams to detect the distance and translate the information into audio and/or visual warnings presented to the driver (e.g., via speakers or monitor screens in the vehicle). Another method is to use cameras, such as rear-facing cameras that assist a driver while the vehicle is in reverse by presenting the rear view of the vehicle on a monitor screen. Cameras may also be used to capture the front view and side views.

These techniques, however, like the mirrors discussed above, are all "one directional at a time", meaning they would indicate and present the risk information on one side at a time (front, or rear, or left, or right). Some methods may provide multiple screens for the drivers, with each illustrating information on one side. While the information and warning signals are helpful, the drivers do not gain a global view of the vehicle's surrounding conditions in an intuitive and instantly digestible manner. Fundamentally, those techniques fail to provide an instantaneous and full dynamic of the surrounding environment, including nearby vehicles and their positioning relative to the drivers; thus, drivers may always be susceptible to surprising collisions. Many road accidents have resulted from the lack of situational awareness in any direction relative to the vehicle.

In order to effectively assist drivers in managing risk and maintaining situational awareness while operating a vehicle, thus, techniques are needed to (1) acquire information about the surrounding conditions of the vehicle operators in real time, (2) aggregate this, and (3) present a global picture of the surrounding environment to the driver in an intuitive and instantaneous manner.

BRIEF SUMMARY

The following presents a simplified summary of some embodiments of the present disclosure in order to provide a basic understanding of the present disclosure. This summary is not an extensive overview of the present disclosure. It is not intended to identify key/critical elements of the present disclosure or to delineate the scope of the present disclosure. Its sole purpose is to present some embodiments of the present disclosure in a simplified form as a prelude to the more detailed description that is presented below.

As such, methods for visual presentation of vehicle positioning relative to the surrounding objects using an electronic computer device are presented, the methods including: causing the electronic computing device to provide a display of the interested objects on a same interface according to their actual relative positions; causing the electronic computing device to enable instant communications among the objects displayed on the same interface; causing the electronic computing device to enable an instant screen sharing among the objects displayed on the same interface; and causing the electronic computing device to enable instant screen sharing with broader audiences. In some embodiments, the methods causing the electronic computing device to provide a display of the interested objects on a same interface according to their actual relative positions include: pre-processing and calibrating the image capturing devices; receiving a plurality of images continuously; building a deep learning model for object recognition and identification; constructing a driving surface for object display; applying a deep learning model to recognize and identify interested objects; determining positions of identified objects on a driving surface; and presenting the identified objects on the driving surface screen. In some embodiments, the methods causing the electronic computing device to enable an instant screen sharing among the objects displayed on the same interface include: registering the participation of the communication programs in the pre-processing steps; causing the communication channels to be established for the registered vehicle operators; presenting symbols on the driving surface screen to indicate the availability of the communications among the registered vehicle operators; and providing communication control mechanism on the driving surface screen for initiating, conducting and terminating communications. In some embodiments, the methods causing the electronic computing device to enable an instant screen sharing among the objects displayed on the same interface include: registering the participation of the communication programs in the pre-processing steps; causing the communication channels to be established for the registered vehicle operators; presenting symbols on the driving surface screen to indicate the availability of the screen sharing among registered vehicle operators; and providing communication control mechanism on the driving surface screen for initiating, conducting and terminating screen sharing. In some embodiments, the methods causing the electronic computing device to enable instant screen sharing with broader audiences include: registering the participation of the communication programs in the pre-processing steps; causing the communication channels to be established for the registered imagery and data capturers; projecting the imagery and data capturers to maps; and providing an interface for screen sharing from the selected imagery and data capturers presented on maps.

In other embodiments, a computing device program product for visual presentation of vehicle positioning relative to surrounding objects using a computing device is presented, the computing device program product including: a non-transitory computer readable medium; first programmatic instructions for causing the electronic computing device to provide a display of the interested objects on a same interface according to their actual relative positions; second programmatic instructions for causing the electronic computing device to enable instant communications among the objects displayed on the same interface; third programmatic instructions for causing the electronic computing device to enable an instant screen sharing among the objects displayed on the same interface; and fourth programmatic instructions for causing the electronic computing device to enable instant screen sharing with broader audiences, wherein the programmatic instructions are stored on the non-transitory computer readable medium.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
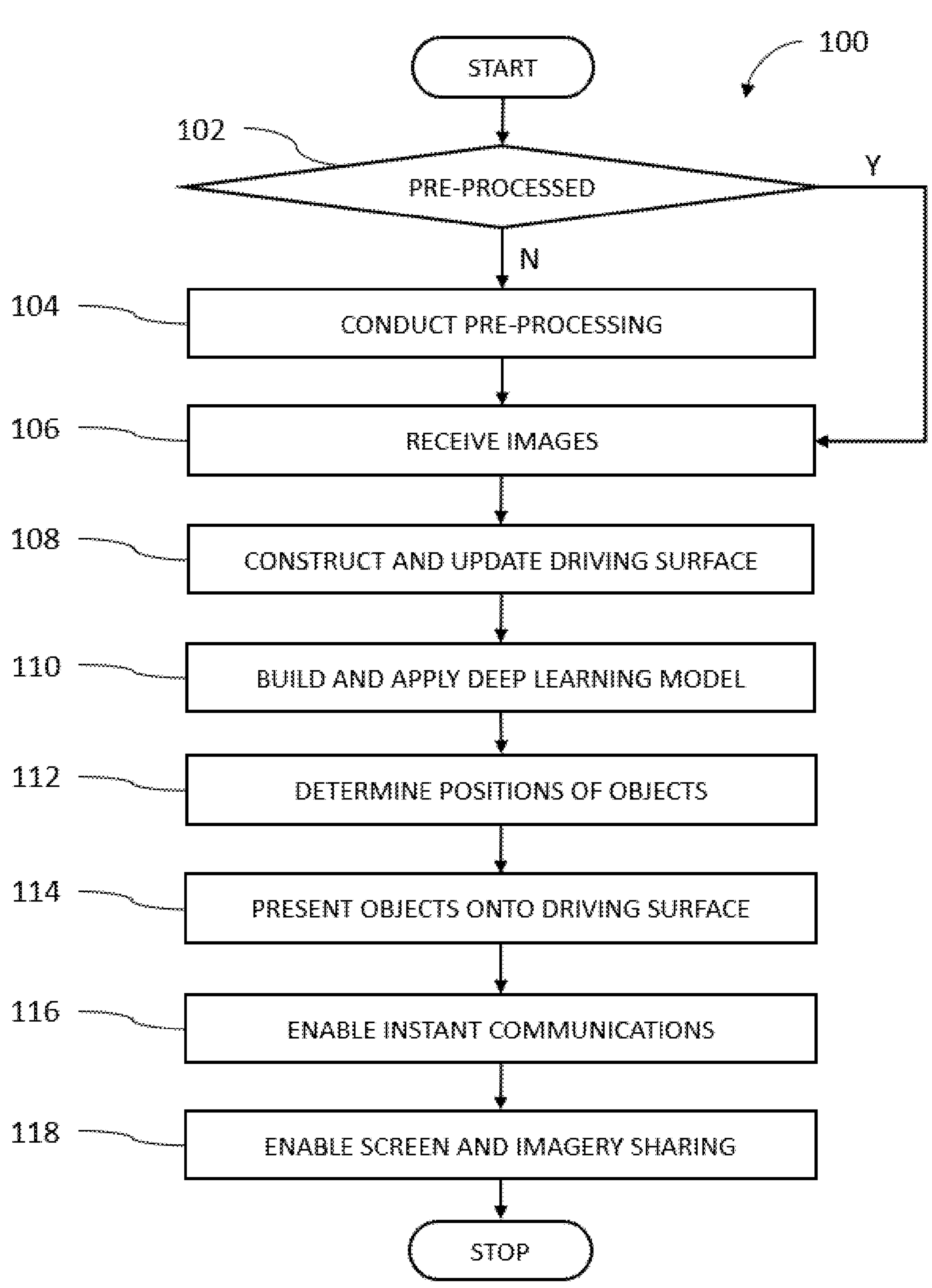
FIG. 1 is an illustrative flowchart of an overview of methods for visual presentation of vehicle positioning relative to surrounding objects in accordance with embodiments of the present disclosure.

As will be appreciated by one skilled in the art, the present disclosure may be a system, a method, and/or a computer program product. The computer program product may include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, a cellphone, and any suitable combination of the foregoing.

A computer readable storage medium, as used herein, is not to be construed as being transitory signals/per se/, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, Java, Python or the like, and conventional procedural programming languages, such as the "C" programming language or similar programming languages. The computer readable program instructions may execute entirely on the user's computer including mobile device like cellphone, tablet or the like, as a stand-alone software package, or partly on the user's computer and partly on a remote computer or entirely on the remote computer or server. In the latter scenario, the remote computer may be connected to the user's computer or mobile device through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, mobile device such as cellphone or tablet, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer program instructions may also be loaded onto a computer, a cellphone, a tablet, or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 is an illustrative flowchart of an overview of methods for visual presentation of vehicle positioning relative to surrounding objects in accordance with embodiments of the present disclosure. In general, methods provided herein occur in two stages. The first stage generally includes pre-processing input data, and the second stage generally includes generating a visual presentation showing the position of the vehicle relative to surrounding objects. As such, at a first step 102, the method determines whether the pre-processing is accomplished. If the method determines the pre-processing is already accomplished, the method continues to a step 106. If the method determines the pre-processing is not accomplished yet, the method continues to a step 104. At a step 104, vehicles and other objects are categorized, and their dimensional measurements are precalculated, collected and stored. Also, at this step, the necessary physical devices are setup. After the pre-processing is accomplished, the first stage ends. Pre-processing is discussed in further detail below for FIG. 2.

At the second stage, at a step 106, images of the road from front, left, right and rare sides are received. The images may be in a form of a series of camera shots, a series of video pictures, a series of radar signals, a series of laser signals, or the like. At a step 108, the received images are used to construct a representation of a driving surface as a coordinate system on which the objects are precisely positioned. In some embodiments, the constructed representation of the driving surface is continually updated with information included in subsequently received images. The host vehicle is then positioned onto the representation of the driving surface. The term "host vehicle" herein refers to the vehicle which the program will set as the position reference benchmark for the program application sessions. The construction of the representation of the driving surface and the host vehicle positioning on the driving surface are discussed in further detail below for FIG. 3. At a step 110, a deep learning model is built and applied to the images to recognize objects such as vehicles, road blocks, traffic lights, and other objects relevant to providing situational awareness to a driver of the objects in the vicinity of the host vehicle. As the objects are recognized, these objects are registered as transitory objects. As used herein, a transitory object generally refers to a registered object that is beyond the distance limit from the host vehicle, set by the program. Because these objects are beyond the distance limit, these transitory objects will not be further traced by the program and will be removed from the registered object list. The registered transitory objects are further identified according to the categories which are established through the pre-processing setup. Methods for object recognition and identification for the categories are discussed in further detail below for FIG. 4. At a next step 112, the method determines the positions of the identified transitory objects on the driving surface and is discussed in further detail for FIG. 5. Proceeding from here, the method continues with the object presentation to the driving surface. At a step 114, methods proceed to assemble data together and present them on to the driving surface displayed in the user interface. Object presenting will be discussed in further detail below for FIG. 6. At a step 116, the method enables instant communications between the host vehicle and its surrounding vehicles and is discussed in further detail below for FIG. 7. As an extension of the applications, at a step 118, the method, with a further detailed discussion below for FIG. 8, enables a sharing of the driving surface screen and imagery among authorized groups whereupon the methods end.

Figure 2:
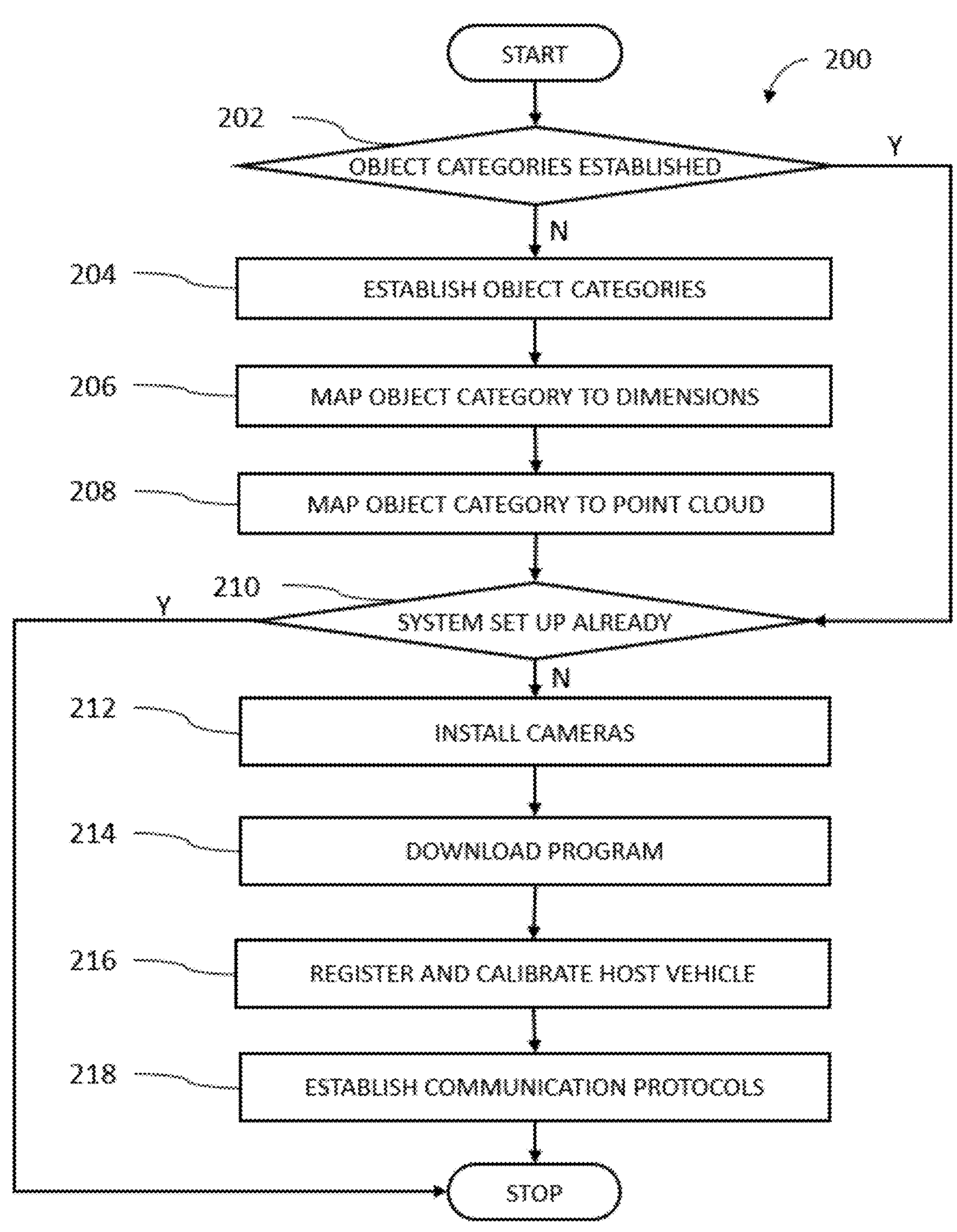
FIG. 2 is an illustrative flowchart of an overview of methods for pre-processing in accordance with embodiments of the present disclosure.

FIG. 2 is an illustrative flowchart 200 of an overview of methods for the pre-processing in accordance with embodiments of the present disclosure. In particular, flowchart 200 provides further clarification for a step 104, FIG. 1. In general, methods provided herein include two pre-processing preparations. The first pre-processing preparation includes establishing mappings between objects and their categorized parameters, such as dimensions, two-dimensional overhead views of the object, and three-dimensional point clouds representing the object in a three-dimensional space. For example, a specific model of truck, as an object category, has an a priori known set of dimensions (e.g., width, bumper-to-bumper length, height, etc.), two-dimensional overhead view, and three-dimensional point cloud. The second preparation includes configuring the host vehicle with cameras and other desired devices to acquire imagery of the surround environment as the vehicle operates. As such, at a first step 202, the method determines whether the object categories are already established. If the method determines the object categories are already established, the method continues to a step 210 to check the status of the second preparation, as discussed in further detail below.

If the method determines the object categories are not yet established, the method continues to a step 204. At a step 204, vehicle design models which are available in the market are listed. In addition, non-vehicle objects which commonly are present in a driving environment, such as traffic lights, poles, road debris, furniture piece, boxes, etc. are also listed. Those objects are categorized with category IDs assigned. At a step 206, the known dimensions of each of the categorized objects are stored into a data processing apparatus according to the corresponding category ID. By doing so, the method establishes a mapping, or correspondence, between an object category, and the dimensions of the object. Furthermore, for each categorized object, the object's a priori known top view, as an interface-presentable art set with its standard dimensions, color code and other information, is stored into a data processing apparatus according to the corresponding category ID. By doing so, the method establishes a mapping between an object category and its interface-presentable art set. At a step 208, method further stores the 3D point cloud, that is, the 3D coordinates of the structure of the object, into a data processing apparatus for each object category. By doing so, the method establishes a mapping between an object category and its point cloud.

At a step 210, to perform the second pre-processing preparation, the method determines whether the system is set up already. If the method determines the system is set up already, the method ends. If the method determines the system is not yet set up, the method continues to a step 212 for the second preparation task. At a step 212, a set of physical devices are installed to the host vehicle. In embodiment, the devices may include cameras. In another embodiment, the devices may include laser. In another embodiment, the devices may include radar or other devices. In another embodiment, the devices may include combination of camera, laser, radar and other devices. The installation will ensure those devices capture information from the front, left, right and rare side of the host vehicle. At the next step 214, computer programs are downloaded to a computing device which can be a computer, a cellphone, a tablet, a computer embedded within the vehicle, or the like. Such a computing device may carry a screen for the user interface or may connect to such a screen. Then the method proceeds to a step 216. At a step 216, the method first causes a registration of the host vehicle to the system, including information specifying the vehicle design model. The method allows an unlimited number of vehicles to register as host vehicle, and thus, a same computing device may perform the techniques described herein while being used on any of a number of vehicles. After the registration, the method continues to cause a calibration of the imagery capturing devices, that is, to cause a procedure to identify the precise positions of the imagery capturing devices with respect to the vehicle. Further, the method causes a calibration of the vertical and horizontal angular correspondence for each pixel of the images the camera captures. Further, the method causes the establishment of the communication protocol, which may be or may be not in a form of Bluetooth, between the operating device and the imagery capturing devices. The method then, at this step, causes the user to select one of the registered host vehicles as the selected host vehicle. At a next step 218, the method causes to establish communication protocols for the users who decide to register in communication programs. The protocols enable the communications among participated host vehicles in the vehicle operation processes, or in other times. The communications may include verbal chats during the vehicle operations, driving surface screen sharing, imagery sharing, position sharing through GPS, and the like. In embodiments, the protocols may include free WiFi connections to the designated servers, paid channels, joint cellphone plans, or any other means. The method causes the allowance for the users to turn on or turn off the participation of the communication programs at any time.

Figure 3:
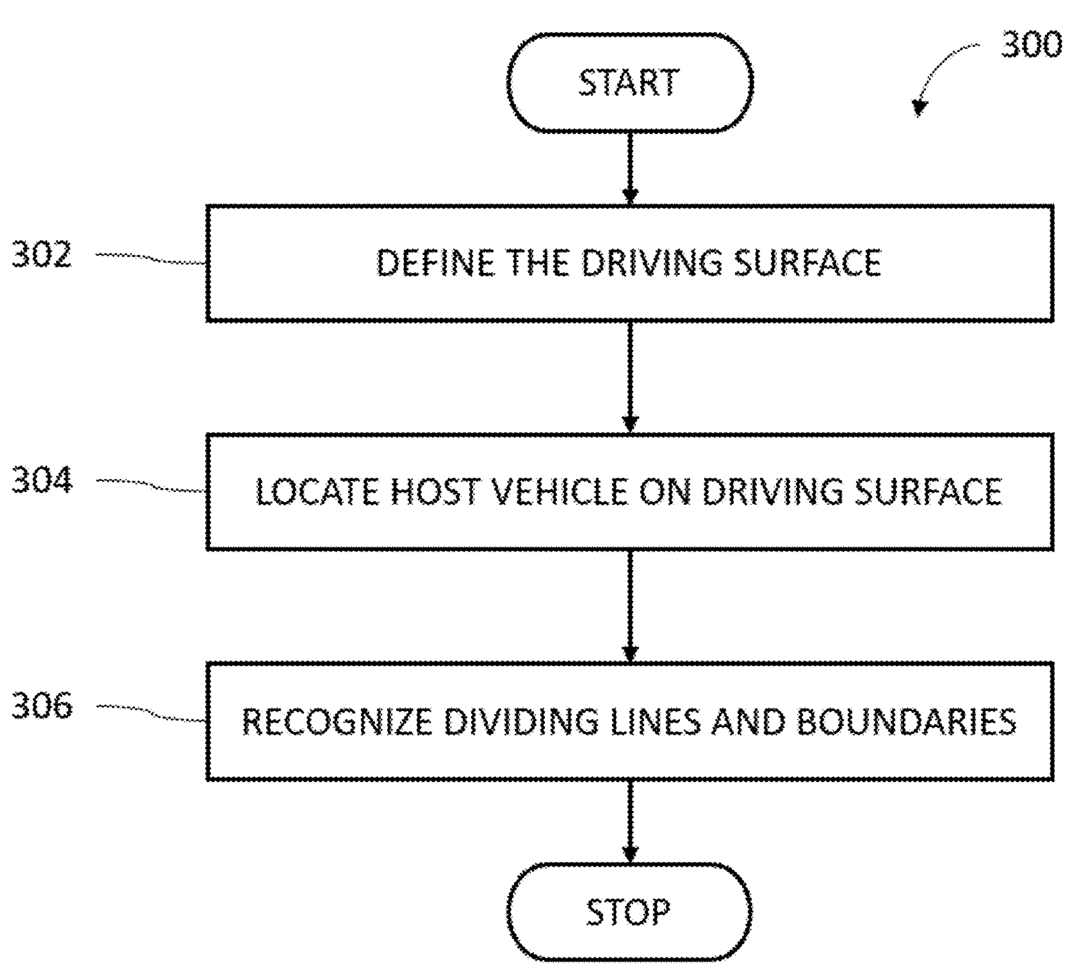
FIG. 3 is an illustrative flowchart of an overview of methods for constructing and updating driving surface with a coordinate system in accordance with embodiments of the present disclosure.

FIG. 3 is an illustrative flowchart 300 of an overview of methods for constructing and updating a representation of a driving surface with a coordinate system in accordance with embodiments of the present disclosure. In particular, flowchart 300 provides further clarification for a step 108, FIG. 1. At a step 302, a representation of a driving surface is constructed as follows. As the physical positions of the cameras, or other imagery capturing devices, are determined during the pre-processing, the height of each of the cameras relative to the road on which the vehicle is traveling is known. A plane which is perpendicular to the gravitational line through each camera, and with its distance to the camera being the corresponding height, is defined as the driving surface. At a step 304, the host vehicle is located on the driving surface according to the dimensions registered to the system by a step 216. Next, at a step 306, the road dividing lines and other lane boundaries are recognized from the received images. For each position point represented by a pixel in the images, the related vertical angle, as was established during the pre-processing at step 216, and the height of each camera above the driving surface, as was established during the pre-processing at a step 216, are used to calculate the distance of a point from the camera according based on triangulation, assuming a right triangle is formed with the location of the camera, the road surface below the camera, and the point to be measured being the three vertices of a right triangle. Therefore, the actual distance between each position point represented by the pixel to the host vehicle becomes known. Further, the horizontal angle, as was established during the pre-processing at step 216, is used to identify the coordinates of the position point on the driving surface, along with the distance between the position point to the host vehicle. Particularly, each point of the road dividing lines or lane boundaries is identified on the driving surface. Furthermore, for those line or lane boundary points whose pixels are blocked by other objects in the images, the method uses a derivative calculation to extend naturally as follows. For the lines or lane boundaries with ending sections of zero curvature, that is, straight lines, the method extends the points along with a continued straight line. For the lines or lane boundaries ending with non-zero curvatures, the method extends the points with a line section which is connected to the last visible line or lane boundary section with a continued curvature. Connecting all such points on the driving surface, the method now establishes, or refreshes, a base for the presentation of the surrounding objects relative to the host vehicle.

Figure 4:
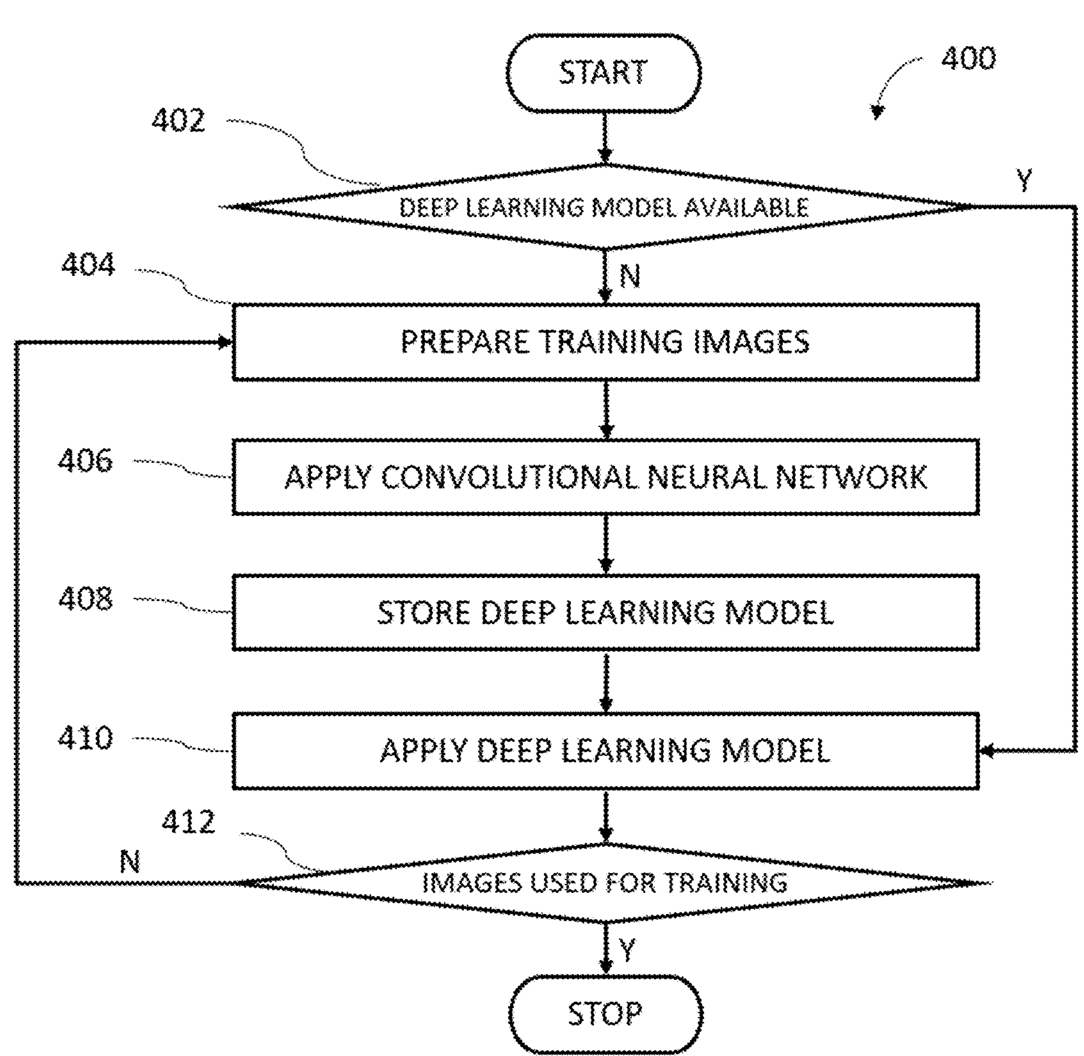
FIG. 4 is an illustrative flowchart of an overview of methods for building and applying a deep learning model in accordance with embodiments of the present disclosure.

FIG. 4 is an illustrative flowchart 400 of methods for building and applying a deep learning model in accordance with embodiments of the present disclosure. In particular, flowchart 400 provides further clarification for a step 110, FIG. 1. At a first step 402, the method determines whether the deep learning model is available to apply. If the method determines the deep learning model is already available, the method proceeds to a step 410 which will be further described below. If the method determines the deep learning model is not available yet, the method proceeds to a step 404. At a step 404, the method prepares the training images from the images received from the cameras. The preparations include, but are not limited to, applying a brightness control, applying an edge detection, applying a texture filtering. The output from the preparations may be received in any manner known in the art without departing from embodiments provided herein. At a next step 406, a convolutional neural network is applied (e.g., trained based on the processed training images). In general, a convolutional neural network is a type of feed-forward artificial neural network where the individual neurons are tiled in such a way that they respond to overlapping regions in the visual field. In embodiments, a convolutional neural network may be updates by methods such as Region Proposal Network (RPN) and Deformable Part Models (DPM) which may improve speed and detection in some examples. At a next step 408, the method stores the deep learning model. A single model may, in some embodiments, suffice. However, multiple models may be generated as needed in embodiments. Further, in embodiments, the deep learning model may be stored in any suitable storage manner known in the art without limitation. At a step 410, the deep learning models are applied. In embodiments, the method includes two levels of deep learning models. The first level is to recognize the interested objects, for example, all vehicles from an image. The image is then partitioned into segmented images according to the recognized objects and those objects may not yet be identified for their categories. Such recognized objects are defined as the registered transitory objects. The second level is to further identify the category for each of the recognized objects. As the objects are recognized and identified, the corresponding category IDs are determined. The method ensures a continuous learning from the passed-in images, therefore, at a next step 412, the method determines whether segmented images of the objects have been utilized to train the deep learning model. If the method determines the segmented images of the objects have not been utilized for the training, it returns to a step 404. If the method determines the segmented images of the objects have already been utilized for the training, the method ends.

Figure 5:
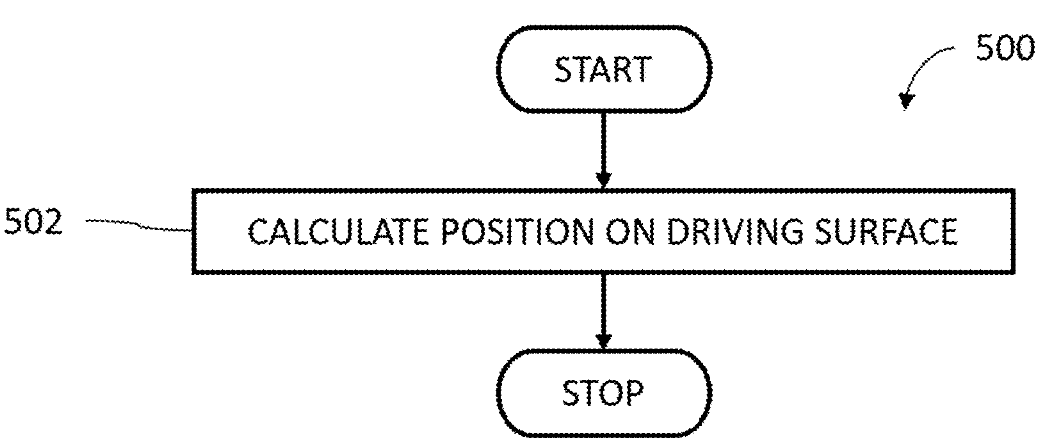
FIG. 5 is an illustrative flowchart of an overview of methods for determining the positions of the identified transitory object with respect to the driving surface in accordance with embodiments of the present disclosure.

FIG. 5 is an illustrative flowchart 500 of an overview of methods for determining the positions of objects with respect to the driving surface in accordance with embodiments of the present disclosure. In particular, flowchart 500 provides further clarification for a step 112, FIG. 1. At a step 502, a bench point of the registered transitory object on the passed-in image is defined. In one embodiment, such a bench point can be the ground touching point of the rare-left wheel. In another embodiment, the bench point can be the ground touching point of the front-right wheel, or any other defined point of the object by the system convention. For each position point represented by a pixel in the images, the related vertical angle, as was established during the pre-processing at step 216, and the height of each camera above the driving surface, as was established during the pre-processing at a step 216, are used to calculate the distance of the position point from the camera based on triangulation, assuming a right triangle is formed with the location of the camera, the road surface below the camera, and the point to be measured being the three vertices of a right triangle. Therefore, the actual distance between each position point represented by the pixel to the host vehicle becomes known. Further, the horizontal angle, as was established during the pre-processing at step 216, is used to identify the coordinates of the position point on the driving surface, along with the distance between the position point to the host vehicle. Particularly, applying such a calculation to the bench point of the registered transitory object, the method identifies the object on the driving surface with its coordinates whereupon the method ends.

Figure 6:
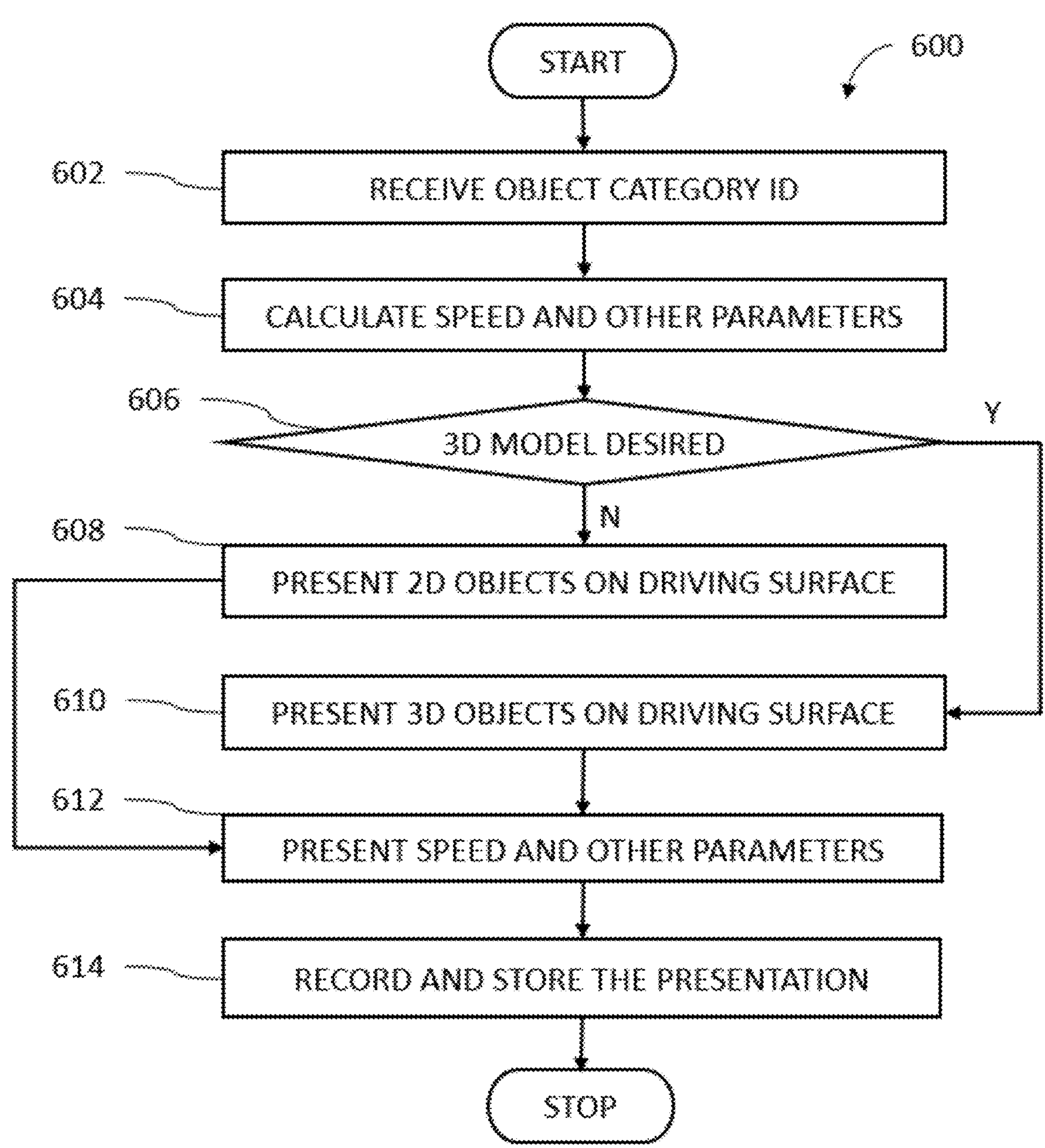
FIG. 6 is an illustrative flowchart of an overview of methods for presenting objects onto the driving surface in accordance with embodiments of the present disclosure.

FIG. 6 is an illustrative flowchart 600 of an overview of methods for presenting objects onto the driving surface in accordance with embodiments of the present disclosure. In particular, flowchart 600 provides further clarification for a step 114, FIG. 1. At a step 602, the method receives the category ID of the identified transitory object. In an embodiment, such category IDs correspond to the design models of the vehicles; for example, category ID 2389 may correspond to Ford® F-150, and category ID 3050 may correspond to Chevrolet® Cruze. In another embodiment, category IDs correspond to objects often observed in a driving environment, such as a concrete lane divider (also known as "Jersey walls"), a traffic light pole, and so on. At a step 604, for each of the identified transitory objects, the method utilizes the information about its consecutive positions, along with the times at which such positions are identified, to calculate the speed and the direction of the speed, of the object at each of the consecutive positions. The calculation may be based on the formulation of "speed=Δ (positions)/Δ (times)" with a moving average smoother. The consecutive speeds are in turn utilized to calculate the acceleration of the object at each of the consecutive positions. The calculation may be based on the formulation of "acceleration=Δ (speeds)/Δ (times)" with a moving average smoother. The speed, orientation, and acceleration values calculated for an object are generally relative to the host vehicle, as the position information used to perform these calculations are also relative to the host vehicle. Furthermore, the speed, orientation, and acceleration values obtained herein can be converted to absolute measurement as the positions of the host vehicle can be converted to the absolute coordinates by the GPS information regarding the host vehicle.

Figure 9:
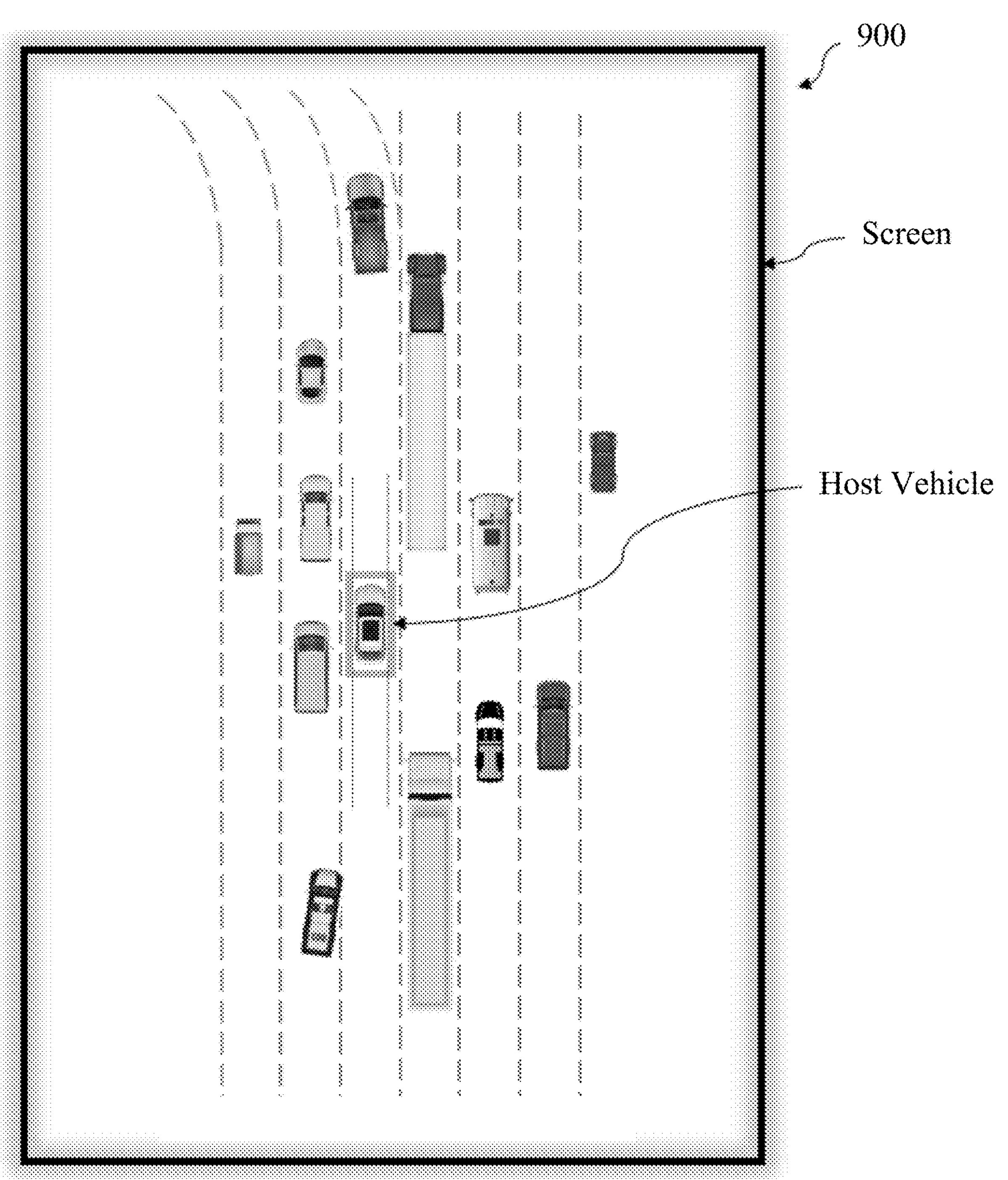
FIG. 9 is an illustration of the identified 2D transitory objects presented on a 2D driving surface in accordance with embodiment of the present disclosure.
Figure 10:
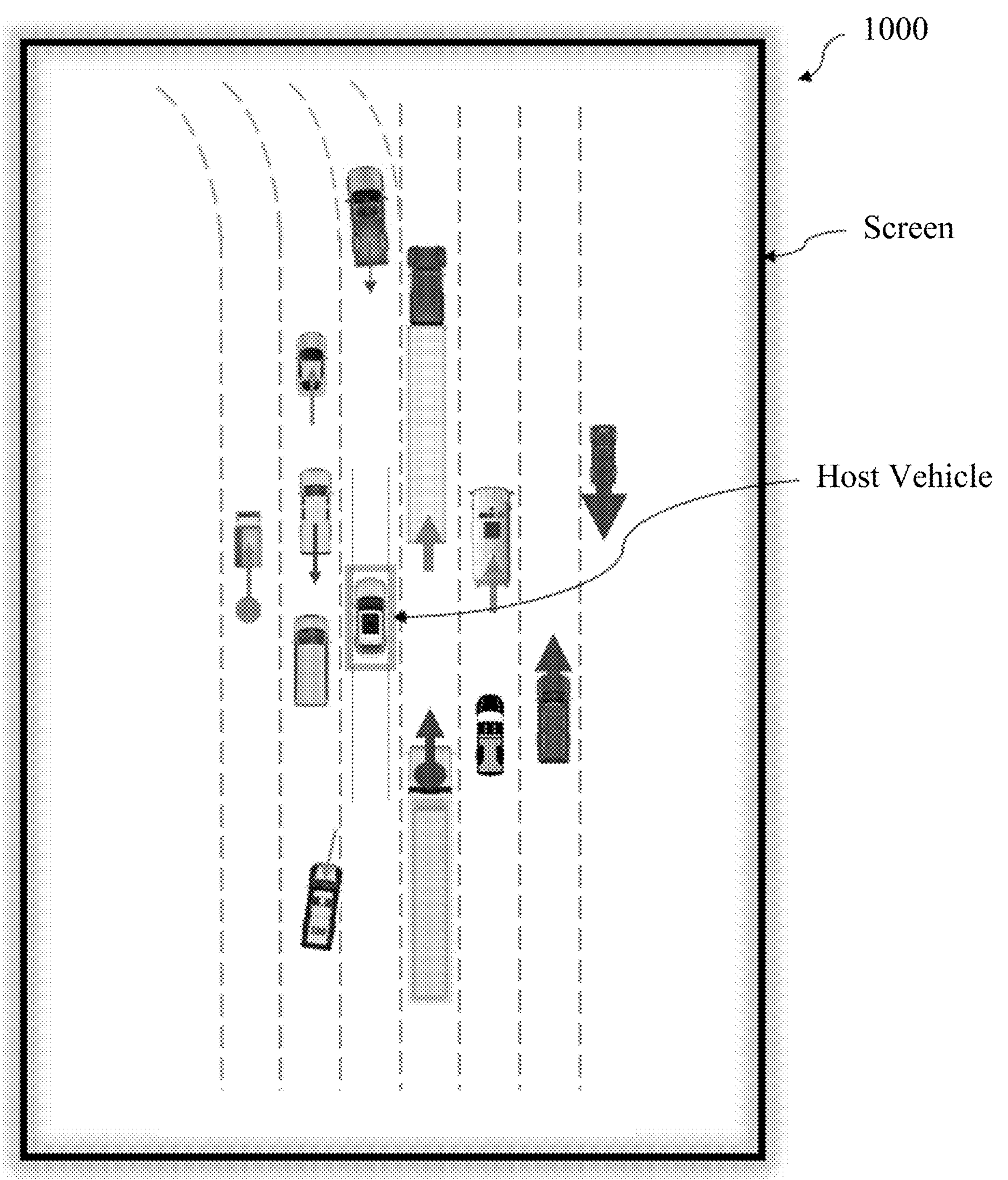
FIG. 10 is an illustration of the identified 2D transitory objects presented on a 2D driving surface with corresponding speeds, orientations and accelerations in accordance with embodiment of the present disclosure.

In an embodiment, the method accommodates a two-dimensional (2D) view for the visual presentation of vehicle positioning in a representation of the environment in which the vehicle is located. In another embodiment, the method accommodates a three-dimensional (3D) view for the visual presentation of vehicle positioning in a representation of the environment in which the vehicle is located. The method then proceeds to a step 606 to determine whether a 2D or 3D presentation is desired. If a 2D presentation is desired and so selected, the method proceeds to a step 608. If a 3D presentation is desired and so selected, the method proceeds to a step 610. At a step 608, the method causes a 2D art of the identified transitory objects with the received category ID to be retrieved and to display on a 2D driving surface presented on a user interface. Such a 2D art is made available during the pre-processing at a step 206. FIG. 9 is an illustrative screen 900 of a 2D presentation of the identified transitory objects on a 2D driving surface. At a step 610, the method causes a 3D art of the identified transitory objects associated with the received category ID to be retrieved and to display on a 3D driving surface presented on a user interface. Such a 3D art is made available during the pre-processing at a step 208. At a next step 612, the method utilizes a symbol system to present the speeds and other parameters, including the orientations, the accelerations and other information derived therefrom, of the identified transitory objects to the driving surface on a user interface. The symbol system may consist of texts, shapes, colors, voicing signals and other elements. FIG. 10 is an illustrative screen 1000 of a 2D presentation of the identified transitory objects with speeds, orientations and accelerates on a 2D driving surface. In FIG. 10, the arrows indicate the speed of the surrounding vehicles relative to the host vehicle with the size of the arrow reflecting the velocity. In embodiments, the arrows may illustrate with colors. For example, the red arrow may indicate the corresponding vehicle is approaching while the green arrow may indicate it is departing relative to the host vehicle, therefore the host vehicle operator may only pay a close attention to the red arrowed surrounding vehicles. The vehicles without arrows attached may indicate the relative speed to the host vehicle is zero, which means they are moving at the same direction and at the same speed. In FIG. 10, some arrows are attached with a dot. The size of the dots may indicate the magnitude of acceleration for a given object, with larger dots indicating higher acceleration values and smaller dots indicating lower acceleration values (or vice versa). Arrows without a dot attached may indicate the relative speed is steady. The symbol system in FIG. 10 shall not be construed as the only means employed by the method. In embodiments, many reasonable symbol systems may be adopted. At a next step 614, the method causes the storage of the visual presentations of the vehicle positioning according to the timeline. In one embodiment, the storage may be in a form of video films of the screen presentations according to the timeline. In other embodiments, the storage may be in a form of preservation of the historical data such that all presentations can be reproduced according to the timeline.

Figure 7:
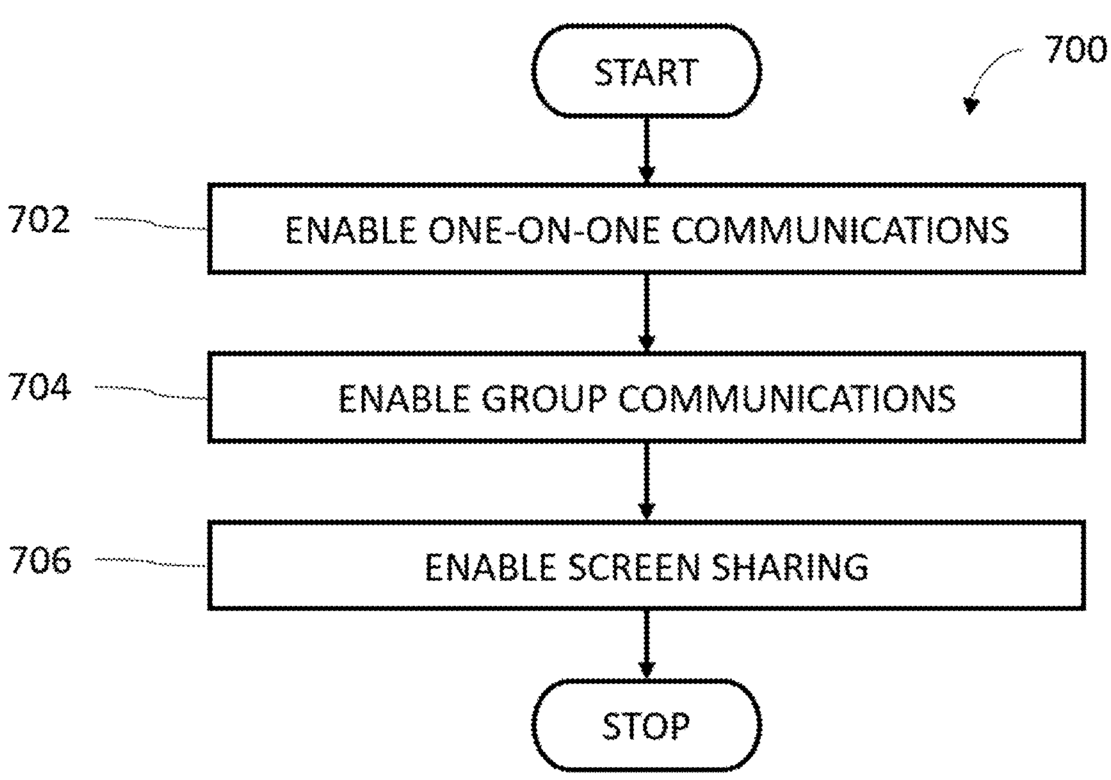
FIG. 7 is an illustrative flowchart of an overview of methods for enabling instant communications and screen sharing among vehicle operators in accordance with embodiments of the present disclosure.

FIG. 7 is an illustrative flowchart 700 of an overview of methods for enabling instant communications and screen sharing among vehicle operators in accordance with embodiments of the present disclosure. In particular, flowchart 700 provides further clarification for a step 116, FIG. 1. Instant and timely communications between the vehicle operators would reduce many traffic conflicts and misunderstanding about the state of the environment in which a driver is operating a vehicle, and therefore would reduce the probability that collisions or other incidents occur. At a step 702, if the host vehicle, as well as the targeted transitory vehicle for communications, are registered for the communication program as described in a step 218, their driving surface interfaces will illustrate an indication that the vocal communication is available. If the user touches a target vehicle figure presented on the driving surface, a message according to a defined protocol will be sent to the corresponding vehicle. Audio and visual signals, in any selected forms according to embodiments, will be presented through driving surface interfaces of both the sending vehicle and receiving vehicle, and a vocal communication channel can be initiated according to operator input. The vocal communication channel may be terminated, and communications on such a channel may end, when the operators of either or both of the sending vehicle or the receiving vehicle provide a termination signal via the driving surface interface of their respective vehicle. The signal may include a touch to a symbol on the screen, a voice indication, a defined length of silence, or the like.

In another embodiment, communications may be established based on membership within a group of vehicles or operators of vehicles. At a step 704, a symbol is made available on the driving surface screen. Unless such a symbol is touched which indicates the operator is unwilling to join the communications, a communication channel is automatically established among those vehicles which appear on the representations of the driving surface and whose operators have registered for the communication program during the pre-processing at a step 218. As the vehicle operators speak, the corresponding vehicle objects on the representations of the driving surface will spark or give a clear indication of the message-sending vehicle or vehicles.

In some cases, vehicle operators may wish to acquire information about the driving conditions of the road further ahead. Using the techniques described herein, a driver can acquire such information by observing the driving surface screens of the vehicles ahead. At a step 706, the method proceeds further to cause the capability to share the driving surface screens among the registered transitory object operators. The user may request a driving surface screen sharing by touching a desired object figure on her or his own driving surface screen, or by other means. At such a request, the method causes the driving surface screen of the desired transitory object to appear as an independent page on the screen used by the request initiator. The method utilizes a screen sharing technology to simply transmit the screen pixels for the driving surface screen sharing. In some embodiments, information from multiple vehicles can be aggregated into a single, larger image which may allow for the generation and rendering of a representation of the driving surface including information about the immediate environment in which a vehicle is operating as well as the environment in which the vehicle will be operating at some future point in time.

Figure 8:
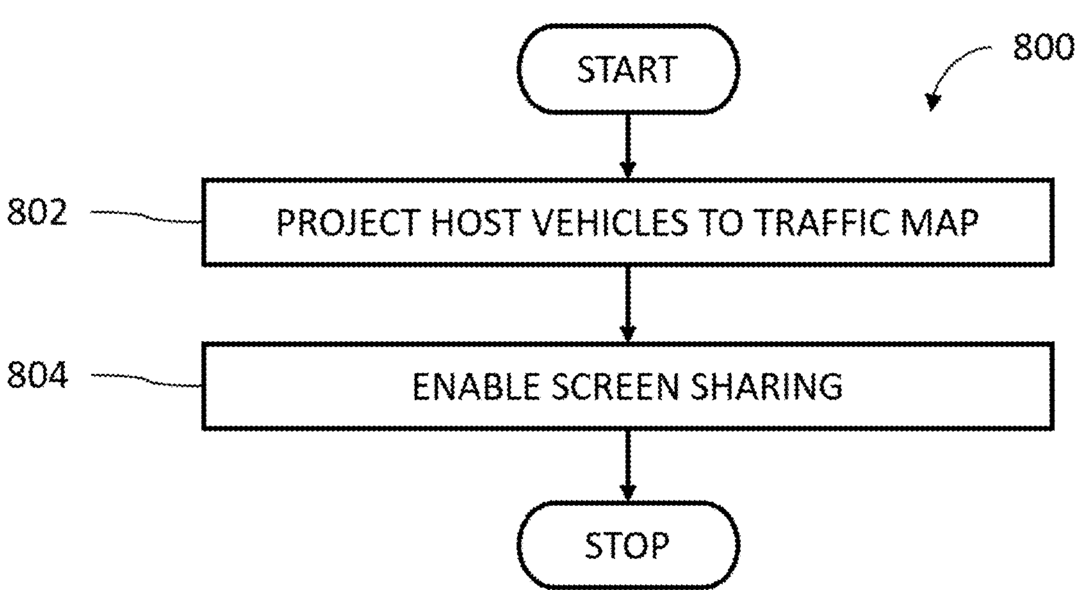
FIG. 8 is an illustrative flowchart of an overview of methods for enabling instant driving surface screen sharing and imagery sharing in accordance with embodiments of the present disclosure.

FIG. 8 is an illustrative flowchart 800 of an overview of methods for enabling instant driving surface screen sharing and imagery sharing in accordance with embodiments of the present disclosure. In particular, flowchart 800 provides further clarification for a step 118, FIG. 1. Many times, one may desire to know the road condition of particular segments of the road regardless of whether an individual is driving. At a step 802, the method causes a projection of the registered host vehicles to a traffic map, or traffic maps. The registered host vehicles which registered in the communication programs at a step 218 will be illustrated on the traffic map without their identities revealed. At a step 804, when a user, who is authorized for the screen sharing by either participating in the communication programs or by other means, selects a desired host vehicle from the traffic map, the method causes the screen sharing of the selected host vehicle through the protocols established during the pre-processing at a step 218. Such screens may include the driving surface screen, the front cameras, the rare cameras, the left-side cameras, the right-side cameras, or the like.

Figure 11:
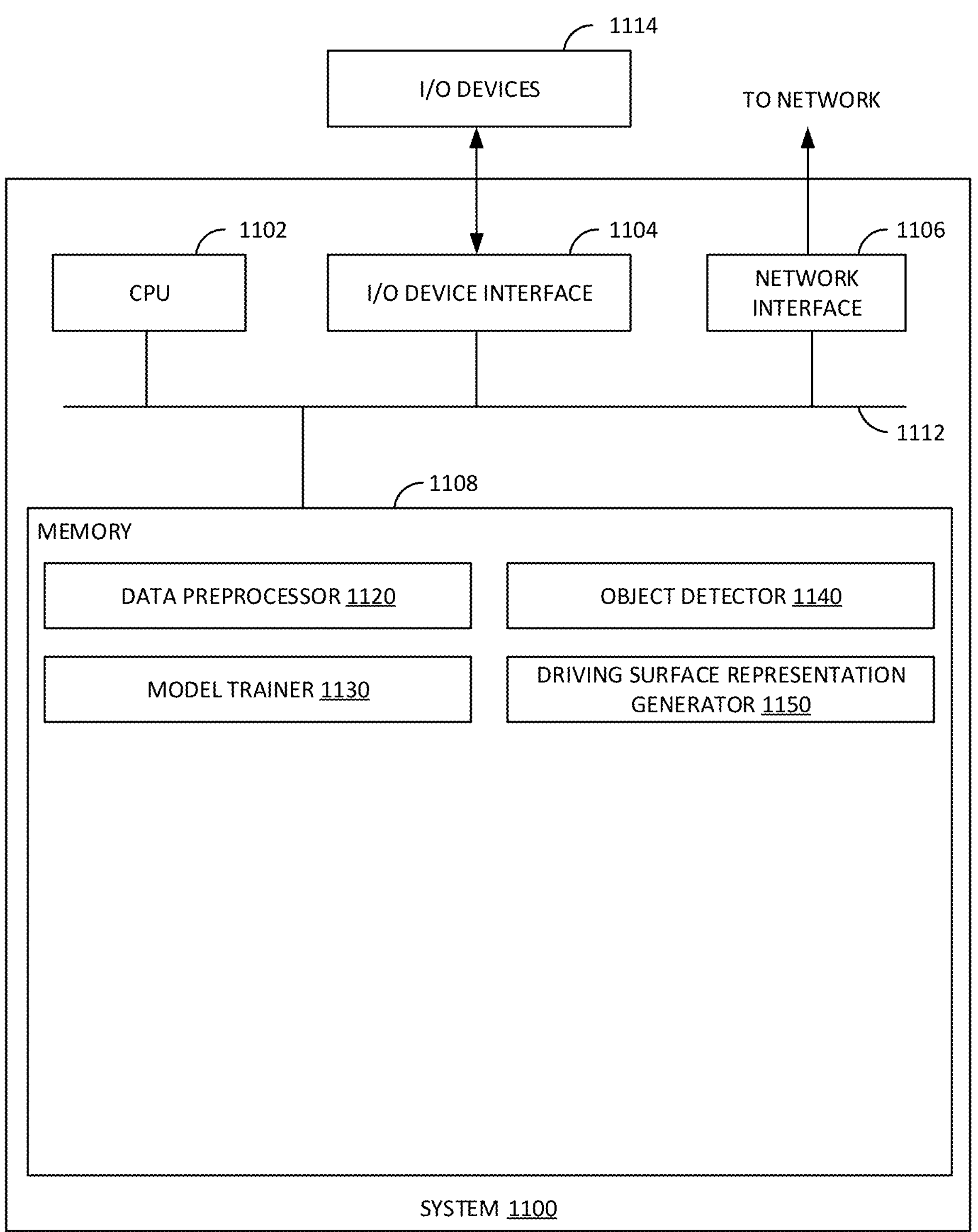
FIG. 11 illustrates an example system on which aspects of the present disclosure may be implemented.

FIG. 11 illustrates an example system 100 configured to perform the methods described herein, including, for example, the operations illustrated in FIGS. 1 through 8.

As shown, system 1100 includes a central processing unit (CPU) 1102, one or more I/O device interfaces 1104 that may allow for the connection of various I/O devices 1114 (e.g., keyboards, displays, mouse devices, pen input, etc.) to the system 1100, network interface 1104 through which system 1100 is connected to a network (which may be a local network, an intranet, the internet, or any other group of computing devices communicatively connected to each other), a memory 1108, and an interconnect 1112. The I/O devices 1114 and/or network interface 1104 may be used to receive requests to generate, retrieve, and transfer digital tokens on a blockchain.

CPU 1102 may retrieve and execute programming instructions stored in the memory 1108. Similarly, the CPU 1102 may retrieve and store application data residing in the memory 1108. The interconnect 1112 transmits programming instructions and application data, among the CPU 1102, I/O device interface 1104, network interface 1106, and memory 1108.

CPU 1102 is included to be representative of a single CPU, multiple CPUs, a single CPU having multiple processing cores, and the like.

Memory 1108 is representative of a volatile memory, such as a random access memory, or a nonvolatile memory, such as nonvolatile random access memory, phase change random access memory, or the like. As shown, memory 1108 includes a data preprocessor 1120, model trainer 1130, object detector 1140, and driving surface representation generator 1150. Data preprocessor 1120 generally may be configured to pre-process data for training a machine learning model to predict the locations of objects in a driving environment, for example as discussed with respect to FIG. 2. Model trainer 1130 uses the preprocessed data to train one or more machine learning models, as discussed with respect to FIG. 4. Object detector 1140 uses the model(s) trained by model trainer 1130 to detect objects and predict the distance from a vehicle to an object, as discussed with respect to FIGS. 3 through 5. Finally, driving surface representation generator 1150 uses the information about the objects generated by object detector 1140 to generate a representation of the environment in which a vehicle is operating, as discussed with respect to FIGS. 6 through 8.

Additional Considerations

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for visual presentation of a position of a vehicle relative to surrounding objects using an electronic computing device, the method comprising:

displaying objects of interest on a same interface according to positions of each respective object relative to the vehicle;

enabling communications among the objects of interest displayed on the same interface;

enabling screen sharing among the objects of interest displayed on the same interface; and enabling screen sharing with devices associated with objects other than the objects of interest, wherein the displaying the objects of interest on the same interface comprises:

pre-processing and calibrating one or more image capturing devices;

receiving a continuous stream of images:

constructing a driving surface for object display:

applying a deep learning model to recognize and identify objects of interest from the continuous stream of images;

determining positions of identified objects on a driving surface; and presenting the identified objects on a driving surface screen, wherein constructing the driving surface for object display comprises:

identifying dimensions of the vehicle;

identifying art of a top view of the vehicle;

identifying a 3D point cloud of the vehicle;

applying the deep learning model to recognize road lines and road boundaries in the stream of images, relative to at least the top view of the vehicle;

computing and extending road lines and road boundaries to fill missing spots in one or more images from the stream of images; and presenting the vehicle on the screen as a benchmark of the driving surface, the presenting being based on the 3D point cloud, the art of the top view of the vehicle, the dimensions of the vehicle, and the extended road lines and road boundaries.

2. The method of claim 1, wherein pre-processing and calibrating the one or more image capturing devices comprises:

categorizing the objects of interest by design models associated with each respective object of interest;

collecting and building dimensions for each of a plurality of object categories;

collecting and building two-dimensional (2D) art of a top view for each respective object category of the plurality of object categories;

collecting and building three-dimensional (3D) point clouds for each respective object category of the plurality of object categories;

establishing a corresponding relationship between each respective object category and associated dimensions, 2D art of the top view, and 3D point cloud;

determining positions of the one or more image capturing devices relative to the vehicle such vertical and horizontal angular correspondence between segments of images captured by the one or more image capture devices is calibrated; and establishing communication protocols between the vehicle and the one or more image capturing devices.

3. The method of claim 1, wherein the deep learning model comprises a convolutional neural network trained for object recognition and identification based on a plurality of training images, the training images including a plurality of known objects, pre-processed to clean and texture map the plurality of training images based on the plurality of known objects.

4. The method of claim 1, wherein the applying a deep learning model to recognize and identify objects of interest comprises:

receiving one or more images from the one or more image capture devices;

applying the deep learning model to the received one or more images to recognize one or more areas of interest;

applying the deep learning model to the received one or more images to identify objects in the areas of interest identified in the received one or more images;

returning a plurality of identified objects and associated parameters; and refining the deep learning model based on the received one or more images and the plurality of identified objects and associated parameters.

5. The method of claim 4, wherein the refining the deep learning model comprises:

segmenting the received one or more images according to the plurality of identified objects;

tracking the plurality of identified objects from the segmented one or more images until category identifications for the recognized objects are identified by the deep learning model; and generating an updated training data set based on a subset of images from the received one or more images to a training image pool mapped to the object identifications.

6. The method of claim 1, wherein determining the positions of identified objects on the driving surface comprises:

identifying vertical and horizontal angles relative to the image capturing devices associated with each pixel on an image; and determining the positions of the identified objects based on the identified vertical and horizontal angles relative to the image capturing devices.

7. The method of claim 1, wherein presenting the identified objects on the driving surface screen comprises:

retrieving graphical objects from a storage according to a category identifier associated with each respective object of the identified objects;

adjusting the graphical objects according to one or more calculated parameters for each respective object of the identified objects;

displaying the adjusted graphical objects onto the driving surface;

plotting symbols onto the driving surface to indicate speed, acceleration, and other parameters of the identified objects relative to the vehicle; and storing a representation of the driving surface, adjusted graphical objects, and symbols for retrieval.

8. The method of claim 1, wherein enabling communications among the objects of interest displayed on the same interface comprises:

registering participation of communication programs in one or more pre-processing steps;

establishing one or more communication channels for one or more registered vehicle operators;

presenting symbols on a driving surface screen to indicate availability of the communications channels among the registered vehicle operators; and providing a communication control mechanism on a driving surface screen for initiating, conducting and terminating communications.

9. The method of claim 1, wherein enabling screen sharing among the objects of interest displayed on the same interface comprises:

registering participation of communication programs in one or more pre-processing steps;

establishing one or more communication channels for one or more registered vehicle operators;

presenting symbols on a driving surface screen to indicate availability of screen sharing among registered vehicle operators; and providing communication control mechanism on the driving surface screen for initiating, conducting, and terminating screen sharing.

10. The method of claim 1, wherein enabling screen sharing with devices associated with objects other than the objects of interest comprises:

registering participation of communication programs in one or more pre-processing steps;

establishing one or more communication channels for one or more registered imagery and data capturers;

projecting data from the registered imagery and data capturers onto one or more electronic maps; and establishing an interface for screen sharing from the registered imagery and data capturers.

11. An electronic computing device for visual presentation of a position of a vehicle relative to surrounding objects comprising:

a memory having executable instructions stored thereon; and a processor configured to execute the executable instructions in order to cause the electronic computing device to:

render a display of objects of interest on a same interface according to relative positions of the objects of interest relative to the vehicle, wherein in order to render the display of objects, the processor is configured to cause the electronic computing device to:

pre-process and calibrate one or more image capturing devices;

receive a continuous stream of images;

construct a driving surface for object display;

apply a deep learning model to recognize and identify objects of interest;

determine positions of identified objects on a driving surface; and present the identified objects on a driving surface screen, wherein in order to determine the positions of the identified objects on the driving surface, the processor is configured to cause the electronic computing device to:

identify vertical and horizontal angles relative to the image capturing devices associated with each pixel on an image; and determine the positions of the identified objects based on the identified vertical and horizontal angles relative to the image capturing devices;

enable communications among the objects displayed on the same interface;

enable screen sharing among the objects displayed on the same interface; and enable instant screen sharing with broader audiences.

12. The electronic computing device of claim 11, wherein in order to pre-process and calibrate the image capturing devices, the processor is configured to cause the electronic computing device to:

categorize the objects of interest by design models associated with each respective object of interest;

collect and build dimensions for each of a plurality of object categories;

collect and build two-dimensional (2D) art of a top view for each respective object category of the plurality of object categories;

collect and build three-dimensional (3D) point clouds for each respective object category of the plurality of object categories;

establish a corresponding relationship between each respective object category and associated dimensions, 2D art of the top view, and 3D point cloud;

determine positions of the one or more image capturing devices relative to the vehicle such vertical and horizontal angular correspondence between segments of images captured by the one or more image capture devices is calibrated; and establish communication protocols between the vehicle and the one or more image capturing devices.

13. The electronic computing device of claim 11, wherein the deep learning model comprises a convolutional neural network trained based on a plurality of training images, the training images including a plurality of known objects, pre-processed to clean and texture map the plurality of training images based on the plurality of known objects.

14. The electronic computing device of claim 11, wherein in order to construct the driving surface, the processor is configured to cause the electronic computing device to:

identify dimensions of the vehicle;

identify art of a top view of the vehicle;

identify a 3D point cloud of the vehicle;

apply the deep learning model to recognize road lines and road boundaries in the stream of images, relative to at least the top view of the vehicle;

compute and extend road lines and road boundaries to fill missing spots in one or more images from the stream of images; and present the vehicle on the screen as a benchmark of the driving surface based on the 3D point cloud, the art of the top view of the vehicle, the dimensions of the vehicle, and the extended road lines and road boundaries.

15. The electronic computing device of claim 11, wherein in order to apply the deep learning model to recognize and identify objects of interest, the processor is configured to cause the electronic computing device to:

receive one or more images from the one or more image capture devices;

apply the deep learning model to the received one or more images to recognize one or more areas of interest;

apply the deep learning model to the received one or more images to identify objects in the areas of interest identified in the received one or more images;

return a plurality of identified objects and associated parameters; and refine the deep learning model based on the received one or more images and the plurality of identified objects and associated parameters.

16. The electronic computing device of claim 11, wherein in order to present the identified on the driving surface screen, the processor is configured to cause the electronic computing device to:

retrieve graphical objects from a storage according to a category identifier associated with each respective object of the identified objects;

adjust the graphical objects according to one or more calculated parameters for each respective object of the identified objects;

display the adjusted graphical objects onto the driving surface;

plot symbols onto the driving surface to indicate speed, acceleration, and other parameters of the identified objects relative to the vehicle; and store a representation of the driving surface, adjusted graphical objects, and symbols for retrieval.

17. The electronic computing device of claim 11, wherein in order to enable communications among the objects of interest displayed on the same interface, the processor is configured to cause the electronic computing device to:

register participation of communication programs in one or more pre-processing steps;

establish one or more communication channels for one or more registered vehicle operators;

present symbols on a driving surface screen to indicate availability of the communications channels among the registered vehicle operators; and provide a communication control mechanism on a driving surface screen for initiating, conducting and terminating communications.

18. A method for visual presentation of a position of a vehicle relative to surrounding objects using an electronic computing device, the method comprising:

displaying objects of interest on a same interface according to positions of each respective object relative to the vehicle;

enabling communications among the objects of interest displayed on the same interface;

enabling screen sharing among the objects of interest displayed on the same interface; and enabling screen sharing with devices associated with objects other than the objects of interest, wherein the displaying the objects of interest on the same interface comprises:

pre-processing and calibrating one or more image capturing devices;

receiving a continuous stream of images;

constructing a driving surface for object display;

applying a deep learning model to recognize and identify objects of interest from the continuous stream of images;

determining positions of identified objects on a driving surface; and presenting the identified objects on a driving surface screen, wherein pre-processing and calibrating the one or more image capturing devices comprises:

categorizing the objects of interest by design models associated with each respective object of interest;

collecting and building dimensions for each of a plurality of object categories;

collecting and building two-dimensional (2D) art of a top view for each respective object category of the plurality of object categories;

collecting and building three-dimensional (3D) point clouds for each respective object category of the plurality of object categories;

establishing a corresponding relationship between each respective object category and associated dimensions, 2D art of the top view, and 3D point cloud;

determining positions of the one or more image capturing devices relative to the vehicle such vertical and horizontal angular correspondence between segments of images captured by the one or more image capture devices is calibrated; and establishing communication protocols between the vehicle and the one or more image capturing devices.

19. The method of claim 18, wherein the applying a deep learning model to recognize and identify objects of interest comprises:

receiving one or more images from the one or more image capture devices;

applying the deep learning model to the received one or more images to recognize one or more areas of interest;

applying the deep learning model to the received one or more images to identify objects in the areas of interest identified in the received one or more images;

returning a plurality of identified objects and associated parameters; and refining the deep learning model based on the received one or more images and the plurality of identified objects and associated parameters, comprising:

segmenting the received one or more images according to the plurality of identified objects;

tracking the plurality of identified objects from the segmented one or more images until category identifications for the recognized objects are identified by the deep learning model; and generating an updated training data set based on a subset of images from the received one or more images to a training image pool mapped to the object identifications.

20. The method of claim 18, wherein presenting the identified objects on the driving surface screen comprises:

retrieving graphical objects from a storage according to a category identifier associated with each respective object of the identified objects;

adjusting the graphical objects according to one or more calculated parameters for each respective object of the identified objects;

displaying the adjusted graphical objects onto the driving surface;

plotting symbols onto the driving surface to indicate speed, acceleration, and other parameters of the identified objects relative to the vehicle; and storing a representation of the driving surface, adjusted graphical objects, and symbols for retrieval.

* * * * *